United States Patent
Verduijn et al.

(12) 
(10) Patent No.: US 6,740,228 B1
(45) Date of Patent: *May 25, 2004

(54) PROCESS FOR REFORMING PETROLEUM HYDROCARBON STOCKS

(75) Inventors: Johannes Petrus Verduijn, Spijkenisse (NL); Gary Brice McVicker, Califon, NJ (US); John Joseph Ziemiak, Annandale, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 07/855,016

(22) Filed: Jun. 30, 1992

(30) Foreign Application Priority Data

Oct. 30, 1989 (GB) .............................................. 8924410
Oct. 30, 1990 (US) ................. PCT/US90/06307

(51) Int. Cl.[7] ........................ C10G 35/085; C10G 59/00
(52) U.S. Cl. ....................... 208/138; 208/134; 208/135; 208/137; 208/63; 208/64; 208/65
(58) Field of Search ................................ 208/134, 135, 208/137, 138, 63, 64, 65

(56) References Cited

U.S. PATENT DOCUMENTS

| | | |
|---|---|---|
| 2,765,264 A | 10/1956 | Pasik et al. ..................... 208/65 |
| 2,767,124 A | 10/1956 | Myers et al. ................... 208/64 |
| 2,867,576 A | 1/1959 | Honeycutt et al. ............. 208/65 |
| 2,902,426 A | 9/1959 | Heinemann et al. ........... 208/65 |
| 2,937,132 A | 5/1960 | Voorhies et al. ............... 208/64 |
| 2,944,001 A | 7/1960 | Kimberlin et al. ............. 208/80 |
| 3,157,589 A | 11/1964 | Scott et al. ..................... 208/80 |
| 3,216,789 A | 11/1965 | Breck et al. ................. 423/718 |
| 3,305,476 A | 2/1967 | York et al. ...................... 208/79 |
| 3,395,094 A | 7/1968 | Weisz et al. .................... 208/62 |
| 3,432,425 A | 3/1969 | Bodkin et al. .................. 208/80 |
| 3,663,426 A | 5/1972 | Mikovsky et al. .............. 208/65 |
| 3,679,575 A | 7/1972 | Bertolacini et al. ............ 208/65 |
| 3,684,693 A | 8/1972 | Sinfelt et al. ................... 208/65 |
| 3,707,460 A | 12/1972 | Bertolacini et al. ............ 208/65 |
| 3,729,408 A | 4/1973 | Carter et al. ................... 208/65 |
| 3,753,891 A | 8/1973 | Graven et al. .................. 208/62 |
| 3,761,392 A | 9/1973 | Pollock et al. ................. 208/93 |
| 3,770,614 A | 11/1973 | Graven et al. .................. 208/62 |
| 3,772,183 A | 11/1973 | Bertolacini et al. ............ 208/65 |
| 3,776,837 A | 12/1973 | Dautzenberg et al. ......... 208/65 |
| 3,791,961 A | 2/1974 | Sinfelt et al. ................... 208/65 |
| 3,843,740 A | 10/1974 | Mitchell et al. .............. 585/412 |
| 3,883,418 A * | 5/1975 | Drehman et al. .............. 208/65 |
| 3,928,174 A | 12/1975 | Bonacci et al. ................ 208/80 |
| 4,002,555 A | 1/1977 | Farnham et al. ............... 208/80 |
| 4,010,093 A | 3/1977 | Maziuk et al. ................. 208/65 |
| 4,049,539 A | 9/1977 | Yan et al. ....................... 208/65 |
| 4,104,320 A | 8/1978 | Bernard et al. .............. 585/419 |
| 4,134,823 A | 1/1979 | Bertolacini et al. ............ 208/65 |
| 4,162,212 A | 7/1979 | Miller et al. ................... 208/79 |
| 4,190,519 A | 2/1980 | Miller et al. ................... 208/79 |
| 4,222,854 A | 9/1980 | Vorhis, Jr. et al. ............. 208/80 |
| 4,325,808 A | 4/1982 | Kim et al. ...................... 208/65 |
| 4,347,394 A | 8/1982 | Detz et al. .................... 585/419 |
| 4,401,554 A | 8/1983 | Choi et al. ..................... 208/64 |
| 4,434,311 A | 2/1984 | Buss et al. .................... 585/444 |
| 4,435,283 A | 3/1984 | Buss et al. .................... 208/138 |
| 4,436,612 A | 3/1984 | Oyekan et al. ................ 208/65 |
| 4,440,626 A | 4/1984 | Winter et al. .................. 208/65 |
| 4,440,627 A | 4/1984 | Markley et al. ................ 208/65 |
| 4,440,628 A | 4/1984 | Winter et al. .................. 208/65 |
| 4,544,539 A * | 10/1985 | Wortel .......................... 502/66 |
| 4,645,586 A * | 2/1987 | Buss ............................. 208/80 |
| 4,680,280 A | 7/1987 | Pandey et al. ................. 502/66 |
| 4,870,223 A * | 9/1989 | Ellig et al. ................... 585/419 |
| 4,894,214 A | 1/1990 | Verduijn et al. ............. 423/328 |
| 5,491,119 A * | 2/1996 | Verduijn ....................... 502/74 |

FOREIGN PATENT DOCUMENTS

| | | | |
|---|---|---|---|
| BE | 895778 | 5/1983 | |
| BE | 895779 | 5/1983 | |
| EP | 096479 A1 | 12/1983 | |
| EP | 0 167 755 | 1/1986 | ........... C01B/33/28 |
| EP | 0219354 | 4/1987 | ........... C01B/33/28 |
| EP | 0 280 513 | 8/1988 | ........... C01B/33/34 |

* cited by examiner

Primary Examiner—Walter D. Griffin

(57) ABSTRACT

Processes for reforming, and in particular aromatising, hydrocarbons from a petroleum source may be carried out by contacting the hydrocarbons with a catalyst of a zeolite KL impregnated with a metal promotor such as platinum, in which the zeolite crystals are of hockeypuck shape. The processes have a good yield and selectivity for the desired reformed products and the catalyst is stable, is associated with a low rate of coke formation, and has a long catalytically active life before regeneration is required.

26 Claims, 7 Drawing Sheets

PROCESS FOR REFORMING PETROLEUM HYDROCARBON STOCKS

BACKGROUND OF THE INVENTION

This invention relates to a process for reforming a petroleum hydrocarbon stream, particulary hydrodesulfurized highly paraffinic naphtha, wherein the naphtha is reformed over at least one catalyst bed comprising a particular catalyst comprising zeolite KL impregnated with platinum, in which the zeolite crystals have a "hockeypuck" or "coin" shape. The catalyst will hereinafter be referred to as a Pt/KL catalyst.

Use of the Pt/KL catalyst as described results in a significant increase in the aromatic content of the product, minimal cracking of the light naphtha and a consequent improvement in the available octane and hydrogen.

FIELD OF THE INVENTION

The reforming of petroleum hydrocarbon streams is one of the most important petroleum refining processes that may be employed to provide high octane hydrocarbon blending components for gasoline. The process is usually practiced on a straight run naphtha fraction which has been hydrodesulfurized. Straight run naphtha is typically highly paraffinic in nature but may contain significant amounts of naphthenes and minor amounts of aromatics and/or olefins. In a typical reforming process, the reactions include dehydrogenation, isomerization and hydrocracking. The dehydrogenation reactions typically will be the dehydroisomerization of alkylcyclopentanes to aromatics, the dehydrogenation of paraffins to olefins, the dehydrogenation of cyclohexanes to aromatics and the dehydrocyclization of acyclic paraffins and acyclic olefins to aromatics. The aromatization of the n-paraffins to aromatics is generally considered to be the most important because of the high octane rating of the resulting aromatic product. The isomerization reactions included isomerization of n-paraffins to isoparaffins, the hydroisomerization of olefins to isoparaffins, and the isomerization of substituted aromatics. The hydrocracking reactions include the hydrocracking of paraffins and hydrodesulfurization of any sulfur compounds remaining in the feed stock. With lighter naphtha streams (i.e. containing C6 or C7 hydrocarbons), it is often desirable to avoid hydrocracking because of the resulting low carbon number of gaseous products which result.

It is well known that several catalysts are capable of reforming petroleum naphthas and hydrocarbons that boil in the gasoline boiling range. Examples of known catalysts useful for reforming include platinum (optionally with the addition of rhenium or iridium) on an alumina support, platinum on zeolites such as type X and Y (provided the reactants and products are sufficiently small to flow through the pores of the zeolites), platinum on intermediate pore size zeolites as described in U.S. Pat. No. 4,347,394 and platinum on cation exchanged type L zeolites.

While zeolite L catalysts, usually in their hydrogen form, have been employed as catalytic dewaxing catalyst and in other applications, they are particularly useful in reforming because they decrease the amount of hydrocracking which occurs during reforming. For example, U.S. Pat. No. 4,104,320 discloses that the use of zeolite L as a catalyst support increases the selection of the reaction for producing aromatic products. However, this improvement is made at the expense of catalyst life. This catalyst must frequently be regenerated, for example, by subjection to hydrogen treatment, oxidation, oxychlorination, calcining, water treatment and reduction with hydrogen. European Patent Publication EP-A-96479 describes a highly crystalline zeolite L material having a cylindrical morphology. This has improved catalyst life for dehydrocyclization reaction over the conventionally prepared zeolite L disclosed in U.S. Pat. No. 3,216.789.

U.S. patent application Ser. No. 426,211 filed Sep. 28, 1982, to A. Cohen entitled "Improved Zeolite L Catalyst for Reforming" now U.S. Pat. No. 4,448,891 discloses treating a zeolite L material with an alkali solution having a pH of at least 11 prior to calcining the formed catalyst to improve the dehydrocyclization activity of the resulting product. Finally, Belgian Patents Nos. 895,778 and 895,779 disclose use of a barium-exchanged zeolite L catalyst for high yields in reforming, dehydrocyclization, dealkylation, and dehydroisomerization.

The typical reforming catalyst is a multi-functional catalyst which contains a metal hydrogenation-dehydrogenation component which is usually dispersed on the surface of a porous inorganic oxide support, notably alumina. Platinum has been widely commercially used in recent years in the production of reforming catalysts, and platinum on alumina catalysts have been commercially employed in refineries for the past four decades. In the last decade, additional metallic components have been added to platinum as promoters to further the activity or selectivity, or both, of the basic platinum catalyst, e.g. iridium, rhenium, tin and the like. Some catalysts possess superior activity, or selectivity, or both, as contrasted with other catalysts. Platinum-rhenium catalyst, by way of example, possess improved life and high selectivity in contrast to platinum catalysts. Selectivity is generally defined as the ability of the catalyst to product yields of $C_5+$ liquid products with concurrent low production of normally gaseous hydrocarbons, e.g. methane, and coke.

In a reforming operation, one or a series of reactors, or a series of reaction zones, are employed. Typically a series of reactors are employed, e.g., 3 or 4 reaction vessels, which constitute the heart of the reforming unit. Although there are cases where split feed operations are practised, these will be discussed at length below. The typical reaction scheme involves a set of serial feed reactors.

It is known that the amount of coke produced in an operating run increases progressively from a leading reactor to subsequent rectors as a consequence of the different types of reactions that predominate in the several different reactors. The sum total of reforming reactions occurs as a continuum between the first and last reactor of the series. The reactions which predominate among the several reactors differ principally based upon the nature of the feed and the temperature employed within the individual reactors. In the initial reaction zone, which is maintained at a relatively low temperature, the primary reaction involves dehydrogenation of naphthenes to produce aromatics. The isomerization of naphthenes, particularly $C_5+$ and $C_6$ naphthenes, also occurs to a considerable extent. Most of the other reforming reactions also occur, but only to a lesser extent. There is relatively little hydrocracking, and very little olefin or paraffin dehydrocyclization occurring in the first reactor.

Typically, the temperature within the intermediate reactor zones is maintained at a somewhat higher level than in the first or lead reactor of the series. Primary reactions in these intermediate reactors involve the isomerization of naphthenes and paraffins. Where, for instance, there are two reactors placed between the first and last reactor in series, the principal reaction in these middle two reactors involves isomerization of naphthenes, normal paraffins and isoparaffins. Some dehydrogenation of naphthenes may, and usually does occur, at least within the second of the four reactors. The amount of hydrocracking increases in the second reactor as does the amount of olefin and paraffin dehydrocyclization compared with the amount of such reactions occurring in the first reactor.

The third reactor of the series, or second intermediate reactor, is generally operated at a moderately higher temperature than the second reactor. The naphthene and paraffin isomerization reactions continue as the primary reaction in the reactor, but there is very little naphthene dehydrogenation. There is a further increase in paraffin dehydrocyclization, and more hydrocracking. At this stage, few if any alkylcyclopentanes or alkylcyclohexanes will be detected in the process stream since they will previously have been aromatized or hydrocracked.

In the last reaction zone, which is typically operated at the highest temperature of the series, paraffin dehydrocyclization, particularly dehydrocylization of $C_6$ and $C_7$ paraffins, is the primary reaction. The isomerization reactions continue and there is often more hydrocracking in this reactor than in any other reactor of the series.

It is also generally known that increased levels of coke among the several reactors causes considerable deactivation of the catalysts. Whereas the relationship between coke formation, and rhenium promotion to increase catalyst life and selectivity is not known with any degree of certainty, it is believed that the presence of rhenium minimizes the adverse consequences of increased coke level, although it does not appear to minimize coke formation in an absolute sense.

Various methods for minimizing coke make and last bed hydrocracking are disclosed in U.S. Pat. No. 4,436,612, issued Mar. 13, 1984, to Oyekan et al; U.S. Pat. No. 4,440,626 issued Apr. 3, 1984, to Winter et al, U.S. Pat. No. 4,440,627, issued Apr. 3, 1984 to Markley; and U.S. Pat. No. 4,440,628, issued Apr. 3, 1984 to Winter et al.

The present invention, however, is drawn to a process for minimizing coke formation and cracking (and increasing selectivity and catalyst life) by choice of a particular Pt-KL zeolite catalyst. The inclusion of the Pt-KL catalyst in the last stage (or optionally the last two reforming stages) significantly lowers the severity necessary in these reaction stages where the bulk of $C_6$ and $C_7$ paraffin aromatization takes place.

As noted above, there exist several processes for dividing naphtha feedstock into a higher boiling and a lower boiling cut and reforming these cuts separately. U.S. Pat. No. 2,867,576, issued Jan. 6, 1959, to Honeycutt suggests separating straight run naphtha into a lower boiling cut which has a final boiling point (FBP) from about 200° F. to about 275° F. The higher boiling cut is reformed in the presence of added hydrogen, and in the presence of a hydrogenation-dehydrogenation catalyst, at a temperature from about 850° to 950° F., and a pressure from about 300 psig to about 600 psig. The pressure and temperature are said to be so coordinated that excessive laydown of coke on the catalyst is avoided. That is to say when operating at temperatures in the upper end of the permissible range, higher pressures would be used, and while operating at lower temperatures, Honeycutt suggests using lower pressures. The liquid reformate produced in the reaction from the heavier naphtha is, after separation from hydrogen-containing gases, passed to an aromatics separation process. The paraffinic fraction obtained from the separation process is then blended with the lower boiling naphtha fraction and the resulting blend is reformed in the presence of added hydrogen and in the presence of a reforming catalyst which may or may not be of the same type employed in reforming the high boiling naphtha fraction. Since the feed to this reforming stage is said not to contain as many carbon forming constituents as the high boiling naphtha, relatively more severe operating conditions, e.g., a temperature of from about 875 to 975° F., and pressure of about 100 psig to about 400 psig, are said to be useful without danger of excessive coke formation and consequent catalyst deactivation. The higher severity conditions cause the naphthenes to be dehydrogenated to aromatics and a considerable amount of the paraffins to be hydrodecyclized to aromatics.

Other processes typical of the split stream reforming discussed in Honeycutt are:

| U.S. Pat. No. : | ISSUE DATE: | INVENTORS NAME: |
|---|---|---|
| 2,767,124 | October 1956 | MYERS |
| 2,765,264 | October 1956 | PASIK |
| 2,937,132 | May 17, 1960 | VOORHIES |
| 2,944,001 | Jul. 5, 1960 | KIMBERLIN et al |
| 3,157,589 | Nov. 17, 1964 | SCOTT et al |
| 3,305,476 | Feb. 21, 1967 | YORK et al |
| 3,432,425 | Mar. 11, 1969 | BODKIN et al |
| 3,761,392 | Sep. 25, 1973 | POLLOCK |
| 3,776,837 | Dec. 4, 1973 | DAUTZENBERG |
| 4,222,854 | Sep. 16, 1980 | VOORHIES |

Each of these patents describes a process in which a naphtha is split into two or more streams having separate boiling ranges and each stream is separately reformed and usually recombined in a gasoline pool. None of these patents describes the use of zeolite L on any of the various separated naphtha streams.

Another set of similar processes which describe the use of specific zeolites in reforming the light naphtha stream are:

| U.S. Pat. No. : | ISSUE DATE: | INVENTORS NAME: |
|---|---|---|
| 3,753,891 | Aug. 21, 1973 | GRAVEN et al |
| 3,770,614 | Nov. 6, 1973 | GRAVEN |
| 3,928,174 | Dec. 23, 1975 | BONACCI et al |
| 4,002,555 | Jan. 11, 1977 | FARNHAM |
| 4,162,212 | Jul. 24, 1979 | |

Although each of these describes the use of particular zeolitic catalysts on the light naphtha stream, none of them teaches or suggests use of a type L zeolite upon that stream. Indeed, Bonacci et al specifically teaches that type L zeolite is not a part of the disclosed invention.

A further variation is shown in U.S. Pat. No. 4,401,554, issued Aug. 30, 1983 to Choi et al. This patent discloses the separation of a naphtha stream into a high boiling and low boiling portion. The process reforms the high boiling naphtha in a four stage process. The low boiling portion is included into the partially reformed stream between the second and third reactors.

None of these patents describes or suggests the use of a particular Pt-KL catalyst in which the zeolite crystals are of a hockeypuck or coin shape.

There also exist several processes for multistage reforming of naphtha using various types of catalysts in the reactor beds. For instance, U.S. Pat. No. 2,902,426 issued Sep. 1, 1959 to Heinemann et al, suggests reforming gasoline or other naphtha fractions for the purpose of obtaining motor fuel having an improved octane value or for the production of aromatics. The process employs a set of three reactors in series; the first reactor will contain a platinum family metal catalyst effective principally for promoting dehydrogenation. This catalyst was said to have little or no cracking activity. The remaining reactors in the series contain a catalyst promoting acid-catalyzed reactions on an adsorptive alumina. The latter catalyst is halogen-responsive and is used to promote isomerization and selective cracking of the remaining components of the charge. Other serial reforming processes which use different catalysts in the various stages of the process include:

| U.S. Pat. No. : | ISSUE DATE: | INVENTORS NAME: |
|---|---|---|
| 3,684,693 | Aug. 15, 1972 | SINFELT |
| 3,729,408 | Apr. 24, 1973 | CARTER et al |
| 3,772,183 | Nov. 13, 1973 | BERTOLACINI et al |
| 3,791,961 | Feb. 12, 1974 | SINFELT |
| 4,049,539 | Sep. 20, 1977 | YAN et al |
| 4,134,823 | Jan. 16, 1979 | BERTOLACINI et al |
| 4,436,612 | Mar. 13, 1984 | OYEKAN et al |
| 4,440,626 | Apr. 3, 1984 | WINTER et al |
| 4,440,627 | Apr. 3, 1984 | MARKLEY |
| 4,440,628 | Apr. 3, 1984 | WINTER et al |

Each of these patents describes a process in which a naphtha is sent across a number of differing catalysts in its passage through the reforming process. None of these patents describe the use of a zeolite in the final stage or stages to effect the results disclosed therein.

Other processes which described the use of specific zeolites in the last stage of a serial reforming process are:

| U.S. Pat. No. : | ISSUE DATE: | INVENTORS NAME: | ZEOLITE: |
|---|---|---|---|
| 3,663,426 | May 16, 1972 | MIKOVSKY et al | Na/Te/X |
| 3,707,460 | Dec. 26, 1972 | BERTOLACINI et al | Mordenite |
| 4,325,808 | Apr. 20, 1982 | KIM et al | Mordenite, Faujasite, Ferrierite |
| 3,395,094 | Jul. 30, 1968 | WEISZ | (Broad disclosure) |
| 3,432,425 | Mar. 11, 1969 | BODKIN et al | Pores of 4–6 Å |
| 3,679,575 | Jul. 25, 1972 | BERTOLACINI | Mordenite |
| 4,010,093 | Mar. 1, 1977 | MAZIUK | ZSM-5 |
| 3,843,740 | Nov. 21, 1972 | MITCHELL et al | ZSM-5 plus, interalia, Type L |
| 4,190,519 | Feb. 26, 1980 | MILLER et al | ZSM-5 |

Weisz, mentioned above, selects one of many zeolites, including chabazite, gmelinite, stilbite, erionite, offretite, epistilbite, desmin, zeolites T, A, ZK-4, ZK-5. Furthermore, Derwent citation 79,850 D/44 discloses gasoline reforming using a series of reactors in which the last reactor contains a low potassium erionite cracking catalyst.

Although each of these publications describes the use of particular zeolitic catalysts in the last bed of a reforming process, only Mitchell et al teaches the use of a Type L zeolite in that stage. Mitchell et al, however, does not suggest the use of a Type L zeolite having the physical morphologies described herein.

SUMMARY OF THE INVENTION

The present invention provides a process for 15 reforming a petroleum hydrocarbon feed stream comprising reforming the stream over a catalyst bed in which the catalyst comprises a zeolite KL in which the zeolite crystals are cylindrical and have an average length of 0.6 microns or less and an average length:diameter ratio of less than 0.5 and have substantially flat basal planes, which zeolite is impregnated with a metal hydrogenation-dehydrogenation component.

Although zeolites KL are known for use in reforming processes, zeolites having the particular, novel morphology defined above, have, when used as a catalyst base, advantages over previously known zeolites L. Poor utilisation of platinum, poor maintenance of catalyst activity and undesirable secondary reactions can result if the zeolite crystals contain a significant amount of imperfections and if the zeolite channels are relatively long and unidirectional. To improve the properties of such a zeolite the channel length of the zeolite should be decreased to well below 1 micron, but at the same time the surface area of the zeolite crystal should be maintained as large as is practicable, and the crystals should be well-formed i.e. without a significant level of crystal imperfections.

These features are present if good quality zeolite crystals can be made in the form of very flat cylinders. Zeolites having the required morphology and processes for obtaining such zeolites are the subject of international application PCT/US90/06307 (inventor J. P. Verduijn) the contents of which are incorporated herein by reference.

PREFERRED EMBODIMENTS

The cylindrical crystal particles are substantially in the form of cylinders of circular cross section, and preferably substantially in the form of right circular cylinders where the base is normal to the cylinder axis.

The crystals are coin or hockeypuck shaped and have a relatively large diameter and short length. The "length" of a crystal is a measurement of the outer edge of the crystal perpendicular to the basal plane containing the diameter. The length is typically 0.1 to 0.6 preferably 0.1 to 0.3 microns and the diameter is generally 0.3 to 1.5 microns preferably 0.4 to 1.0 microns. When the length/diameter ratio is 0.2–0.5 the crystal shape is termed herein as "hockeypuck". When the ratio is less than 0.2 the shape is termed herein as "coin".

The crystals also have microscopically flat basal planes. This is an indication of the intrinsic quality of the crystals. A measure of flatness is the ratio of height:length, where the height is the longest measurement in the same direction as the length. Thus if the basal plane contains raised steps or terraces (i.e. the crystal shape resembles a clam shell) the maximum measurement or height of the crystal will be greater than the measurement of the length. If the basal planes are flat the height:length ratio will be 1. The height:length ratio of the crystals should be as close as possible to 1, but a ratio of up to 1.2 may be tolerated.

The zeolite which forms the catalyst base used in the process is preferably an aluminosilicate and will be described hereafter in terms of aluminosilicate, although other elemental substitutions are possible; for example, aluminium may be substituted by gallium, boron, iron and similar trivalent elements, and silicon may be substituted by elements such as germanium or phosphorous.

Preferably the zeolite is produced by crystallising a mixture comprising q moles of water, a divalent cation, a source of m moles of $K_2O$, a source of n moles of $SiO_2$ and a source of p moles of, $Al_2O_3$ where m:n is 0.2 to 0.35, preferably 0.24 to 0.30, n:p is 15 to 160, more preferably 20 to 40 and q:m is 45 to 70, more preferably 50 to 65.

The ratios are, as is usual with zeolites synthesis mixtures, interdependent. For example if a high $SiO_2/Al_2O_3$ ratio is used, then a high $K_2O/SiO_2$ should also be used to obtain the necessary alkalinity. A typical ratio of the synthesis mixture is e.g. 2.65 $K_2O/0.5$ $Al_2O_3/10$ $SiO_2/160$ $H_2O$ and a suitable quantity of divalent cation.

Increasing the proportion of alumina intends to increase the ratio of length to diameter, and also to increase the tendency for the contaminant, zeolite W, to form. Increasing the proportion of $H_2O$ also has this effect.

Increasing the proportion of $SiO_2$ congruently increases the dimensions of the crystals produced and also increases the tendency for undesirable amorphous by-products to form. Increasing the proportion of potassium increases the tendency for the crystals to have rough basal planes and hence, an increase in the height/length ratio.

The inclusion of a divalent cation source in the zeolite synthesis mixture encourages the formation of flat basal planes and small crystals of low l/d ratio, and reduces the formation of crystalline contaminants such as zeolite W and erionite.

The source of silica used in the synthesis may be e.g. solid silica or an aqueous solution or colloid of silica such as that sold under the trade name "Ludox" available from E.I. Dupont De Nemours & Co. Colloidal sols are preferred since they result in fewer and smaller contaminating phases. However, other forms such as silicates may be used.

The source of alumina may be alumina introduced into the synthesis mixture as e.g. $Al_2O_3.3H_2O$ previously dissolved in alkali. It is also possible to introduce the source of alumina into the synthesis mixture in the form of aluminum metal dissolved in alkali.

The source of $K_2O$ is preferably introduced into the synthesis mixture as potassium hydroxide.

The divalent cation may be a cation of nickel, magnesium, calcium, barium, cobalt, manganese, zinc, copper or tin. Magnesium and barium have each been found to be particular effective when included in the synthesis mixture for the zeolite. Initial results show that cobalt-containing zeolites are comparable with magnesium or barium-containing zeolites.

The divalent cation may be provided in the form of a powder or a solution, e.g. an aqueous solution of an alkaline earth metal hydroxide. The amount of divalent cation which should be present in the synthesis mixture depends on the particular cation. However, in general, up to 250 ppm based on the weight of the synthesis gel is used. Barium may be used in a amount up to 250 ppm, but an advantageous effect is seen when much smaller amounts, such as 100 ppm are used. Magnesium, on the other hand, need only be present in an amount of about 10 ppm to obtain hockeypuck shaped crystals. Although a source of silica, for example, may contain e.g. magnesium as an impurity, it has been found that use of such silica in the synthesis does not produce the same advantageous effect as when the magnesium or other cation is added to the synthesis mixture from a separate source.

The synthesis gel is heated to induce crystallisation. The temperature at which the gel is heated also affects the morphology of the crystals produced. If the temperature is reduced then there is more nucleation, producing smaller crystals which have small channel lengths and hence are desirable. However, there is also a tendency for the crystal to have rough domed basal planes so that instead of the crystals being flat cylinders they are clam-like in shape. The crystallisation temperature should therefore be chosen with a view to obtaining crystals of as smaller size as is reasonable whilst maintaining the desired crystal shape. Typical temperatures used to obtain crystals of the desired shape are 150 to 200° C.

The gel is heated for a period long enough to form the crystals. This is generally from 60 to 172 hours, typically 60 to 160, preferably 60 to 150 hours. In general, the lower the temperature the longer the time required to reach the same degree of crystallisation with the same synthesis mixture.

In normal preparation from aqueous gels, a hydrated form of the zeolite is first prepared. This may be dehydrated by heating. The zeolite used as a catalyst base in the present process is preferably in the dehydrated form.

The above described process produces a potassium form of the alumina silicate. By ion exchange of this zeolite, in a manner well known to zeolite chemistry, other cations such as Na or H can be introduced in place of the potassium.

The zeolite may also be treated in the same way as conventional zeolites L to improve its mechanical strength, e.g. by forming an extrudate which may be bound by, for example, silica.

The catalyst used in the present process is formed by impregnating or "loading" the zeolite with a metal hydrogenation-dehydrogenation component which promotes the desired reactions. The metal is preferably a metal from group VIII of the periodic table, most preferably platinum or a mixture of platinum and at least one other metal such as tin, rhenium, germanium or iridium.

The loading may be carried out by processes known in the art e.g. the zeolite is allowed to stand for several hours or more in an aqueous solution of one or more platinum salts (optionally with other metal salts present). The loaded zeolite is then filtered, dried, and preferably, calcined. The total amount of metal loaded on the zeolite is typically 0.4 to 0.8 weight per cent based on the weight of the zeolite, preferably about 0.6 weight percent.

In use the zeolite is generally in a catalyst bed. Catalyst beds of a type known to be used with zeolite catalysts may be used, e.g. the catalyst may be used in a fixed bed system, a moving bed system, a fluidised system, or in a batch-type operation. However, it is preferred to use a fixed bed system. The feedstock is then contacted with the catalyst e.g. by passing the feedstock through the catalyst bed at a temperature and pressure appropriate to the feedstock and desired products.

The feedstock is a petroleum naphtha or a hydrocarbon or hydrocarbons that boil in the gasoline boiling range. In particular, highly paraffinic naphtha is a preferred feedstock, but the feedstock can in general contain any acyclic hydrocarbon capable of undergoing ring-closure to produce an aromatic hydrocarbon. Typically such compounds are paraffins, but the feedstock may contain significant amounts of naphthenes and minor amounts of aromatics and/or olefins. Specific examples of acyclic paraffins and olefins which may be used in the feedstock are n-hexane, 2-methylpentane, 3-methylpentane, n-heptane, 2-methylhexane, 3-methylhexane, 3-ethylpentane, 2,5-dimethylhexane, n-octane, 2-methylheptane, 3-methylheptane, 4-methylheptane, 3-ethylhexane, n-nonane, 2-methyloctane, 3-methyloctane, n-decane, 1-hexene, 2-methyl-1-pentene, 1-heptene, 1-octene and 1-nonene.

Typically the feedstock is a mixture of hydrocarbons available in a petroleum refinery e.g. highly paraffinic straight-run naphthas, paraffin raffinates from aromatic extraction or absorption, or $C_6$–$C_{10}$ paraffin-rich streams.

Preferably the feedstock is hydrodesulfurised before undergoing the reforming process. Steps to achieve hydrodesulfurisation are known to those of skill in the art.

Preferably the process is carried out using a plurality of reaction zones as described above, which are at different temperatures and/or pressures. A first reaction zone may comprise a catalyst of a previously known type e.g. based on a zeolite L in which the length:diameter ratio of the zeolite crystals is greater than 0.5, or it may comprise a hockeypuck zeolite KL catalyst. It is preferred to use the hockeypuck or coin shaped zeolite catalyst in a second reaction zone, which is preferably downstream of the first reaction zone or in parallel to the first reaction zone. Preferably the second reaction zone is operated at a higher temperature and lower pressure than the first reaction zone.

The hockeypuck catalyst may be used in combination with one or more other catalysts in a reaction zone. It is preferred that when a plurality of zones is used, different catalysts are used in the first and second reaction zones, the composition of the catalyst in each zone (and the temperature and pressure of each zone) being tailored to meet the requirements of the feedstock and desired products.

The feedstock to each reaction zone may flow through the zone in a direction selected by the skilled person e.g. it may flow upward, downward or in a radial manner. In addition the feedstock may be in a vapor, liquid/vapor or liquid phase when it contacts the catalyst. It is preferred that the feedstock is in the vapor phase.

When a plurality of reaction zones is used, it is preferred that these zones form separate reactors. The configuration of the reactors may be selected so that the feedstock, or a part of the initial feedstock, passes through the reactors in parallel, in series, or in a combination of parallel and series.

In one embodiment of the invention, the process comprises two or more reaction zones in series. The feedstock enters the first reaction zone, which is held at a temperature of 850 to 950° F. (454–150° C.) and a pressure of 300 to 600 psig (2068–4137 kPa). This reaction zone comprises a conventional reforming catalyst. The primary reaction in this zone is the dehydrogenation of naphthenes to produce aromatics, and the isomerization of naphthenes.

A later reaction zone in this series contains the hockeypuck or coin shaped zeolite catalyst. This will be referred to hereinafter as the second reaction zone. Other reactors may be placed intermediate between the first and second reaction zones, or may be placed after the second reaction zone, and may contain a conventional catalyst or a hockeypuck/coin shaped zeolite catalyst. When a plurality of reaction zones are used in series preferably the last reaction zone contains a hockeypuck/coin shaped zeolite catalyst.

Preferably the second reaction zone is at a temperature of 875 to 975° F. (468 to 524° C.), more preferably at a temperature which is higher than the first reaction zone. Preferably the second reaction zone is at a pressure of 100 to 400 psig (689 to 2758 kPa), preferably a pressure which is lower than the first reaction zone e.g. 100 to 200 psig (689 to 1379 kPa).

Other configurations of the reaction zones in a reforming process using a plurality of reaction zones, will be described with reference to using separate reactors for each reaction zone, and using a feed which is a straight-run naphtha containing hydrocarbons of 6 to 10 carbon atoms, although it is to be appreciated that this is a preferred but not essential, form of feedstock.

In one embodiment the $C_6$–$C_{10}$ feedstock first undergoes low severity reforming in a first reactor as described above. The product may then be separated into a stream rich in saturates having 6 to 7 carbon atoms and a stream rich in aromatics having 6 to 10 carbon atoms. The saturate-rich stream is a stream containing more than 50% by weight of the saturates contained in the product from the first reactor. The aromatic-rich stream is a stream containing more than 50% by weight of the $C_6$ to $C_{10}$ aromatics contained in the product from the first reactor.

The saturate-rich stream is then passed through the second reactor, preferably at a higher temperature and lower pressure than the first reactor. The saturated compounds are aromatized in this low pressure reformer. The resulting product may then, optionally, be combined with the $C_6$ to $C_{10}$ aromatic-rich stream taken from the product of the first reactor.

A further embodiment of the invention is the use of parallel reaction zones. A feedstock of hydrocarbons of 6 to 10 carbon atoms is fractionated to give a $C_6$ to $C_7$ cut and $C_8$ to $C_{10}$ cut. Typically the $C_6$–$C_7$ cut will be the fraction boiling at 50–100° C. The heavier cut ($C_8$ to $C_{10}$) undergoes conventional reforming in a first reactor as described above. The lighter cut undergoes reforming at a lower pressure in a second reactor as described above. In this way, the temperature and pressure of the reaction zones can be tailored to the particular feedstock fraction fed to each reaction zone, and the extent of undesirable side reactions or coking is reduced. The products of the parallel reactors may optionally be combined to produce a hydrocarbon product which has a higher octane rating than the feedstock.

These two embodiments of the invention are depicted in the flow charts shown in FIG. 1.

The reaction carried out in the second reactor is essentially an aromatization process and may be carried out independently whether the reaction in the first reactor takes place.

Thus the present invention also provides a process of reforming which is aromatising of a feedstream containing more than 50% by weight, preferably more than 70% by weight, of hydrocarbons of 6 to 7 carbon atoms, comprising contacting said feedstream with a zeolite KL catalyst in which the zeolite crystals are cylindrical and have an average length:diameter ratio of less than 0.5 and have substantially flat basal planes, which zeolite is impregnated with a metal hydrogenation-dehydrogenation component as described above.

The preferred conditions of temperature and pressure for the aromatization reaction are the same as the preferred conditions for the second reaction zone described above.

EXAMPLES

Figure 1:
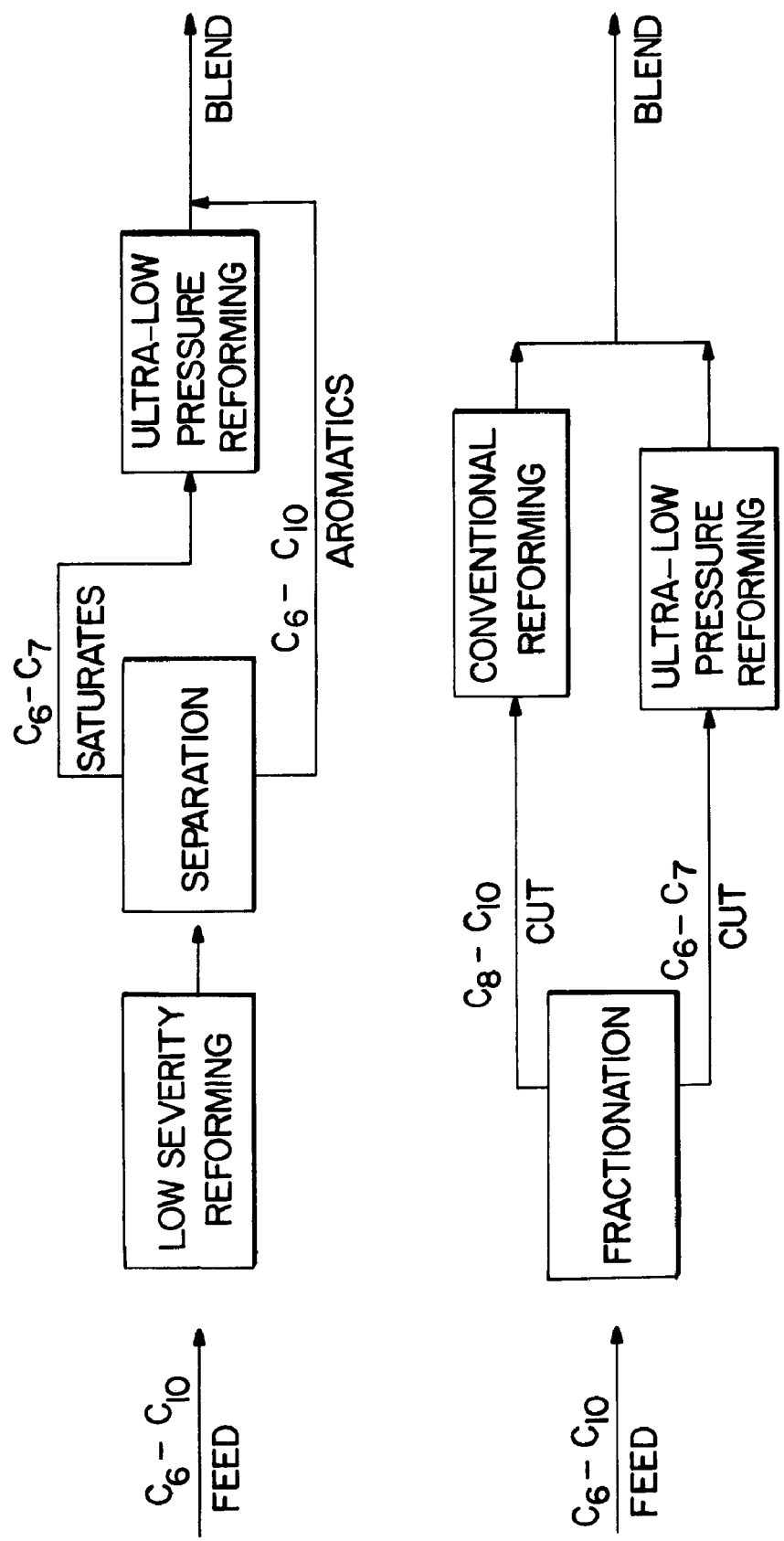
FIG. 1: Shows in flow chart form two embodiments of the process.

The following examples illustrate the invention:

Example 1

Preparation synthesis mixture (weight of reactants are given in grams).

| (A) POTASSIUM ALUMINATE SOLUTION | |
|---|---|
| KOH pellets (86.8% purity) | 34.31 |
| Al(OH)$_3$ (98.6% purity) | 7.91 |
| H$_2$O | 50.00 |
| Rinse Water | 25.07 |
| (B) SILICATE SOLUTION | |
| Ludox HS-40 (Colloidal silica) | 150.26 |
| (C) DIVALENT CATION SOLUTION | |
| Ba(OH)$_2$.8H$_2$O | 0.2008 |
| H$_2$O | 50.01 |
| Rinse Water | 64.57 |

The potassium hydroxide and aluminium hydroxide were dissolved in the water by boiling until a clear solution was obtained. This was cooled to room temperature and corrected for water loss.

The divalent cation source was dissolved in the water by heating until a clear solution was obtained.

The divalent cation solution was added to the colloidal silica, and 64.57 grams of rinse water was used to rinse the beaker which contained the divalent cation solution. The two solutions were mixed using a high shear household mixer for five minutes at low speed.

The potassium and aluminium containing solution was added and the mixture was stirred using the mixer for about 3 minutes.

The composition of the synthesis mixture was:

2.65 K$_2$O/0.0063 Ba/0.5 Al$_2$O$_3$/10 SiO$_2$/1.59 H$_2$O 320.12 grams of the synthesis mixture was transferred to a 300 millimeter stainless steel autoclave which had previously been cleaned using a potassium hydroxide solution. The autoclave was placed in a room temperature oven and heated up within 2 hours to 170° C. and kept there for 72 hours.

The resulting crystalline product was washed with approximately 600 millimeters of wash water. The product was dried overnight at 150° C. 24.0 grams of product was obtained.

The product was analysed by X-ray diffraction (XRD), by measuring toluene absorption, and by taking scanning electron micrographs (SEM).

The XRD pattern shows that the crystals have a zeolite L structure. The toluene absorption, a measure of the absorptive properties of the zeolite, is 10.0 at $p/p_o=0.25$, T=30° C.

The SEM shows that the crystals are well formed, have flat basal planes and are hockeypuck shaped, i.e. with a ratio of length:diameter of less than 0.5.

Further hockeypuck zeolites were produced using a similar process, and the composition and morphologies of these further zeolites (denoted as examples 2 to 4) is set out in table 1.

TABLE 1

| KL ZEOLITE | | COMPOSITION/MORPHOLOGY | | | | |
|---|---|---|---|---|---|---|
| DESIGNATION (A) | COMMENTS | SiO$_2$/Al$_2$O$_3$ | L($\mu$) | D($\mu$) | L/D | H/Pt (B) |
| Standard KL | Standard KL | ~5.8 | 0.8/1.3 | 1.1/1.3 | ~1.0 | 0.83 |
| Example 1 | Experimental KL, Ba Addition: Hockeypuck | ~6.3 | 0.1/0.2 | 0.4/0.6 | ~0.3 | 0.70 |
| Example 2 | Experimental KL, Mg Addition: Hockeypuck | ~6.2 | 0.2/0.6 | 0.6/1.5 | ~0.4 | 0.80 |
| Example 3 | Experimental KL, Mg Addition: Hockeypuck | ~6.4 | 0.2/0.5 | 0.5/1.5 | ~0.4 | 0.76 |
| Example 4 | Experimental KL, Co Addition: Hockeypuck | ~6.5 | 0.1/0.2 | 0.2/0.6 | ~0.3 | 0.74 |
| Pt/Sn | Conventional 0.3 Pt/0.35 Sn on Alumina Catalyst | — | — | — | — | 0.50 |
| Pt/Re | Conventional 0.3 Pt/0.3 Re on Alumina Catalyst | — | — | — | — | 0.44 |

(A) Nominal Pt Loadings, 0.6 wt
(B) Strongly held hydrogen

PREPARATION OF PLATINUM LOADED CATALYST

Zeolite KL (either of standard or hockeypuck morphology) was loaded with platinum to prepare it for use as a catalyst. 250.0 grams of dry Kl powder (oven dried at 160° C. for 16 hours) is added to a solution consisting of 6 cm$^3$ of a standard 0.5 g Pt/cm$^3$ solution diluted to 3.0 cm$^3$ by the addition of 2.40 cm$^3$ of distilled water. The standard Pt solution is prepared using either (NH$_4$)$_4$Pt(NO$_3$)$_2$ or (NH$_4$)$_4$Pt(Cl)$_2$ salts.

To ensure complete metal exchange, the KL powder and dilute Pt solution is allowed to equilibrate at room temperature for 16 hours. The Pt loaded KL zeolite is then collected by filtration and dried under air at 120° C. for 40 hours. The dried sample is pelletized and sized to 20/40 mesh. Finally the dried 10/20 mesh catalyst is calcined under flowing oxygen (500 cm$^3$/min) in a quartz tube furnace at 350° C. for 4.0 hours.

CATALYTIC CONVERSIONS

Hydrocarbon conversion reactors were carried out in a 25 cm$^3$, stainless steel, fixed bed, isothermal unit operating in a single pass mode. The reactor was heated by a fluidized sand bath. Hydrogen was passed through deoxo and molecular sieve drying units prior to use. The feed was delivered to the reactor by a dual barrel Ruska pump which allowed continuous operation. The concentration of sulphur in the feedstock was maintained below 10 ppb by passing the feedstock through massive nickel and alumina guard-beds held at room temperature.

The reactor was held at 510° C. and 135 psig total pressure. Catalysts were reduced in situ at 510° C. under 135 psig hydrogen (500 cm cubed/mins 16 hours). Following reduction the reactor temperature was lowered to 450° C. and the hydrogen flow was adjusted. Feed was introduced at 450° C. into the reactor and the temperature was increased at 10° C./hr to the operating temperature of 510° C. The $H_2$/feed ratio was 4.0.

Direct analysis of all reaction products, (methane through to isomeric xylenes) were made by on line gas chromatography measurements. The product train was equipped with a gas phase sparger to ensure complete product homogenisation. A 30 foot by ⅛ inch outer diameter (9.14 meters by 3.18 millimeter outer diameter) column packed with 20% SP-2100 on a ceramic support allowed complete separation and identification. Detection was by flame ionisation.

The feedstock used in the experiments comprised 54% 3-methylpentane, 36% n-hexane and 10% methylcyclopentane.

Figure 2A:
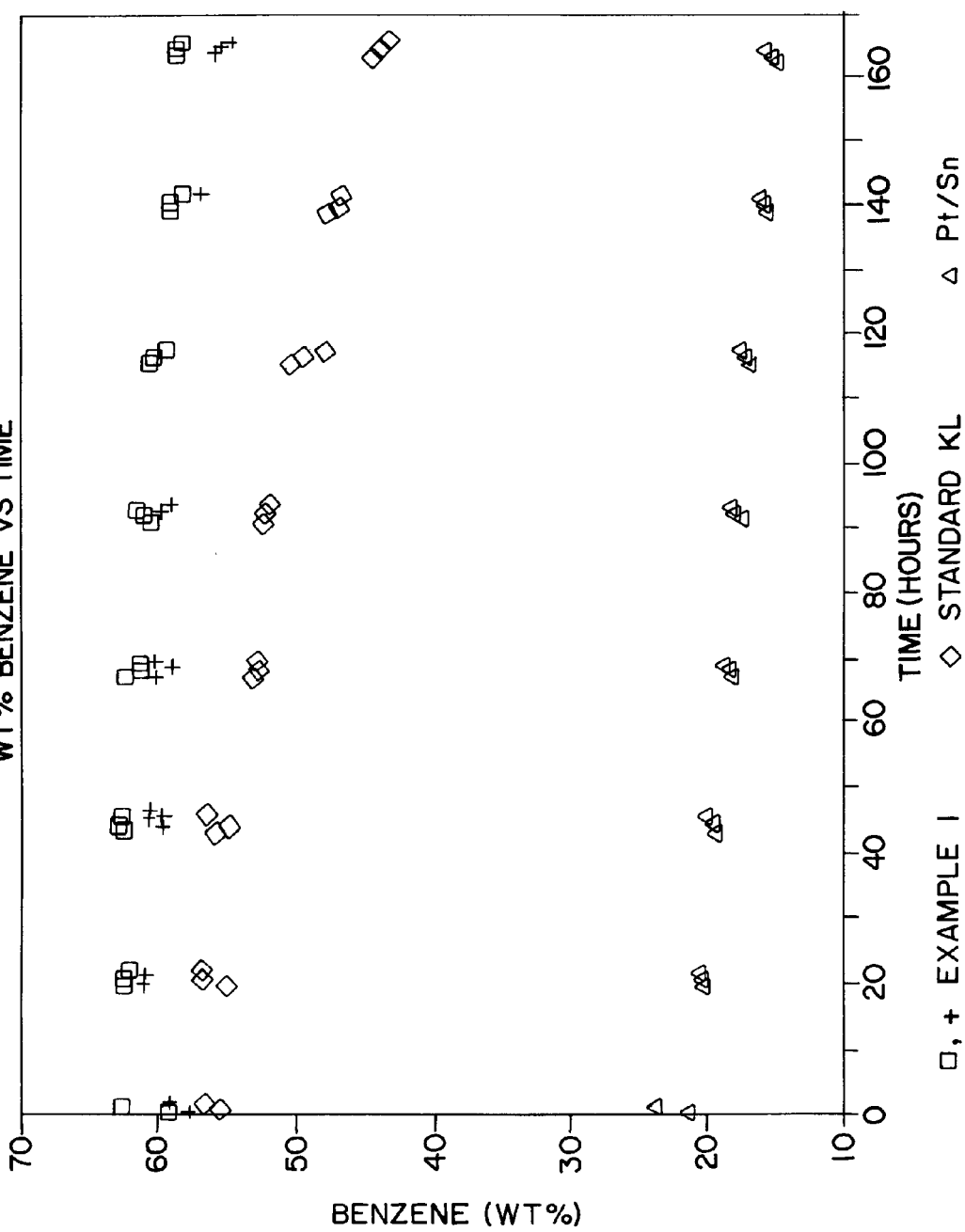
FIG. 2: Shows the yield (FIG. 2A) and selectivity (FIG. 2B) of benzene for a process of the invention and comparative processes using other catalysts.
Figure 2B:
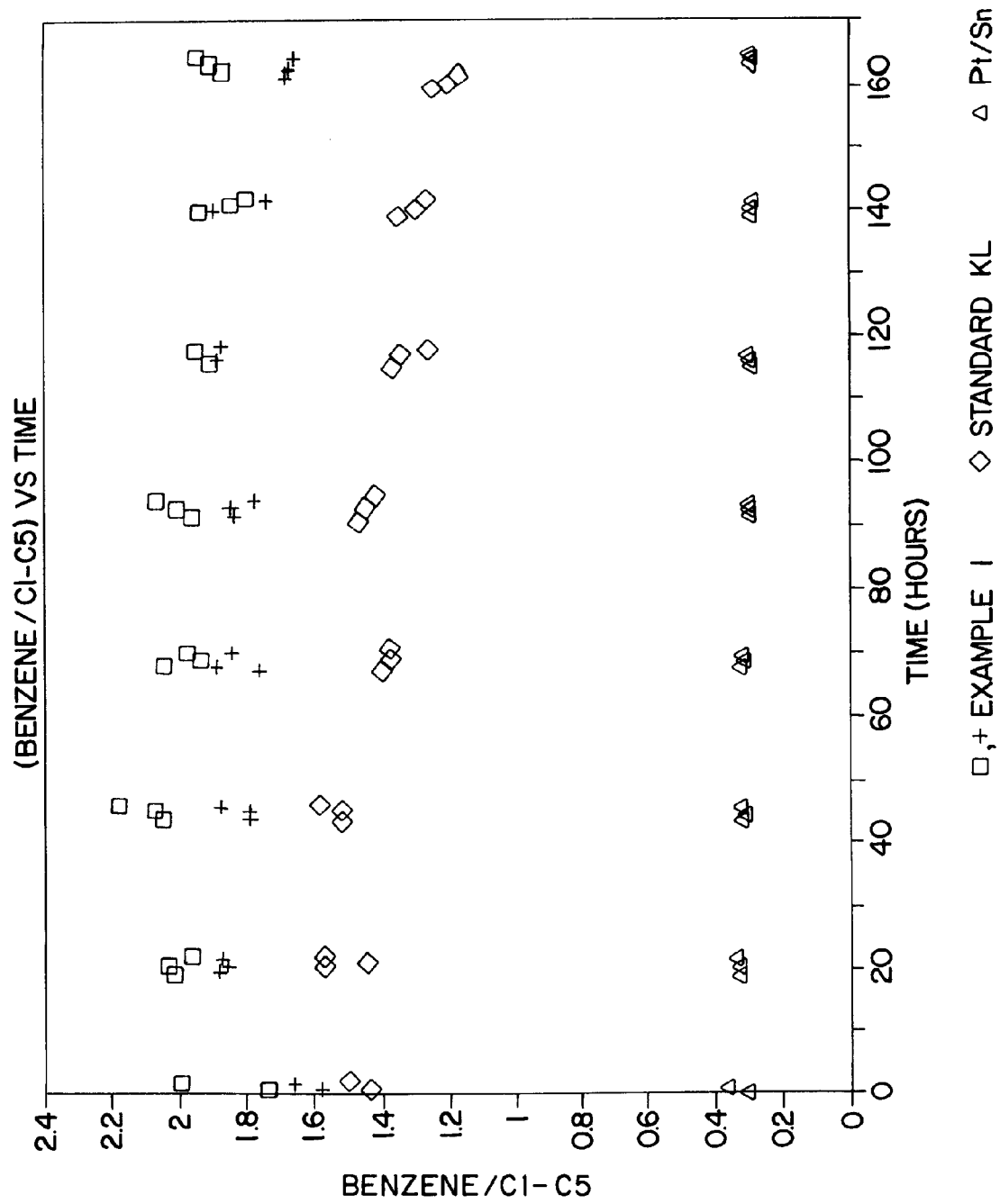

FIG. 2A shows the weight of benzene obtained over a period of time and the FIG. 2B selectivities of benzene (benzene/C1–C5). It can be seen that the very flat cylindrical (hockeypuck) crystals give a better yield and selectivity. Regression analysis performed on the data obtained gave the results indicated in Table 2.

TABLE 2

| CATALYST (A) | PERFORMANCE VALUES (%) AT 120 HR | | | PROJECTED CYCLE (C) LENGTH (HR) |
|---|---|---|---|---|
| | BENZENE | | | |
| | YIELD | SELEC- TIVITY | CON- VERSION | |
| Standard KL L/D ~1.0 | 48.7 | 56.4 | 86.2 | 2060 |
| Hockeypuck KL L/D ~0.3 | 58.6 | 63.0 | 92.0 | 7440 |
| Conventional Pt/Sn (B) | 17.5 | 22.7 | 75.0 | — |

(A) Nominal Pt loadings, 0.6 wt %
(B) 0.3% PT, 0.3% Sn on alumina
(C) Cycle Length predicted for 38% benzene production The projected cycle length is a measure of the time over which the catalyst produces a benzene yield of at least 38%. The longer the cycle length, the longer the catalyst functions before it needs to be regenerated. It can be seen that the improved stability of the "hockeypuck" catalysts gives a greater selectivity and yield and also allows for greatly increased cycle length compared with the reference catalyst of standard KL type.

Figure 3A:
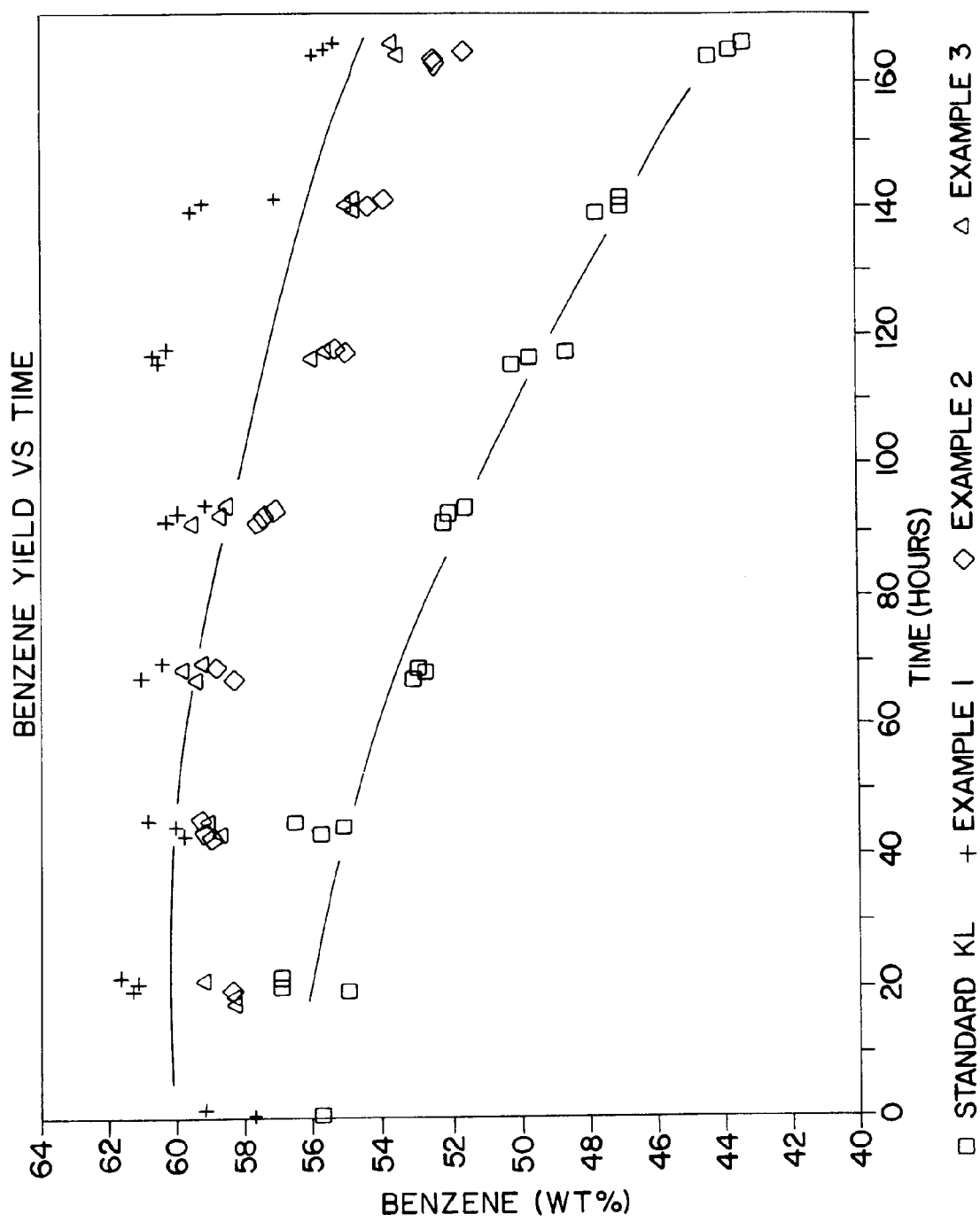
FIG. 3: Shows the yield (FIG. 3A) and selectivity (FIG.3B) of benzene for processes of the invention using a variety of catalysts and, a comparative process using a "standard" KL zeolite catalyst.
Figure 3B:
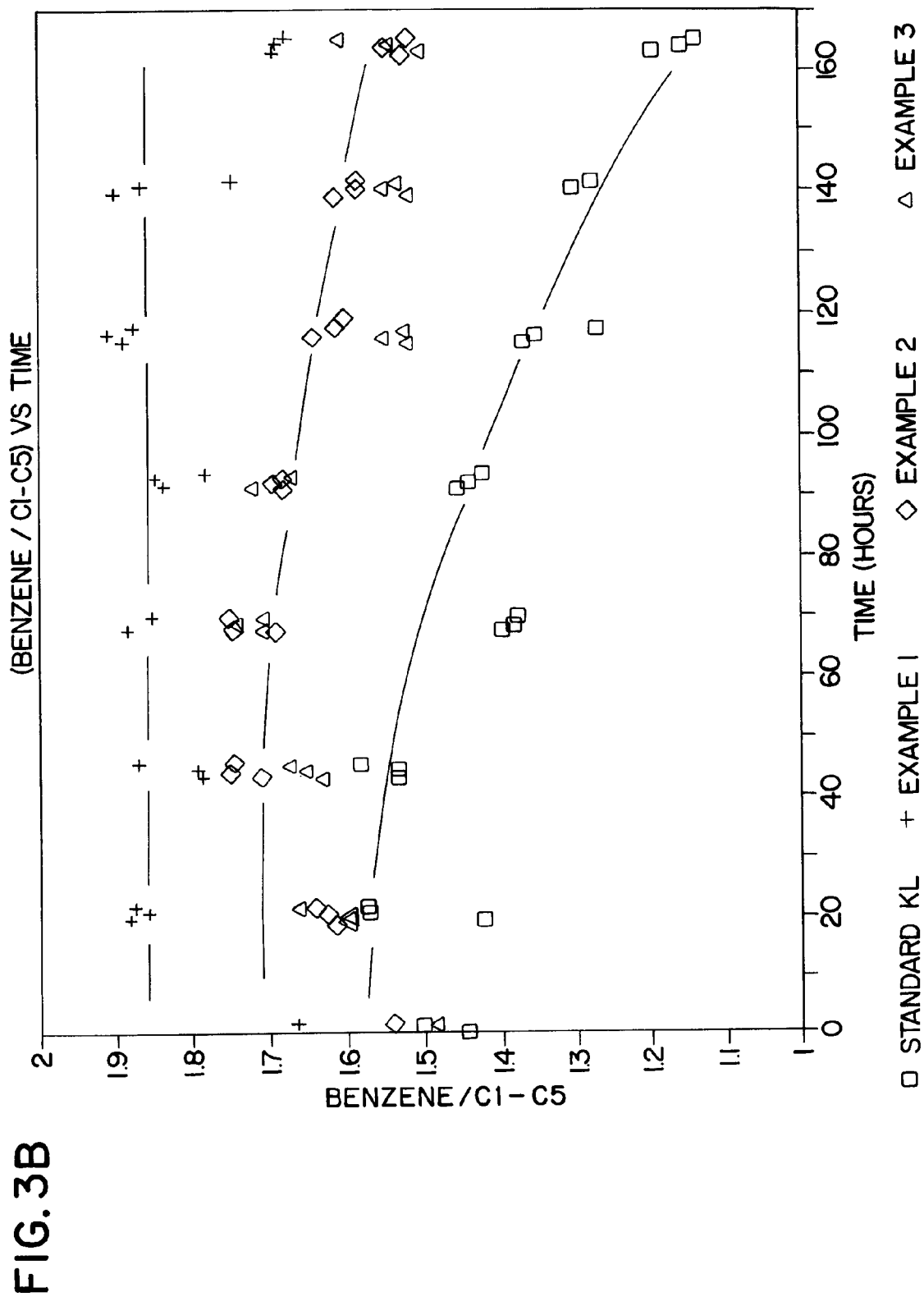

FIG. 3 shows the yield and selectivity of benzene for a standard KL catalyst and for the catalyst of examples 1, 2 and 4. The three examples, each contain a different divalent cation; barium, magnesium or cobalt. The data are represented by the graphs of FIG. 3 and show that the superior performance of the catalyst used in the present process is due primarily to its hockeypuck morphology and not to the presence of a trace amount of a specific divalent cation.

The catalysts were then tested in a process intended to aromatize a C6 to C7 feedstock. The feedstock was a fractionated ALN (Arab Light Naphtha). The cut which fractionated at 50 to 100° C. was used as the feedstock, and contained 42,3% of C6 and 53.7% of C7 hydrocarbons.

Massive nickel followed by massive alumina guard beds were again used. The conditions within the reactions zone were the same as previously i.e. a working temperature of 510° C. at 135 psig. The $H_2$/oil feed ratio was 2.3.

Figure 4A:
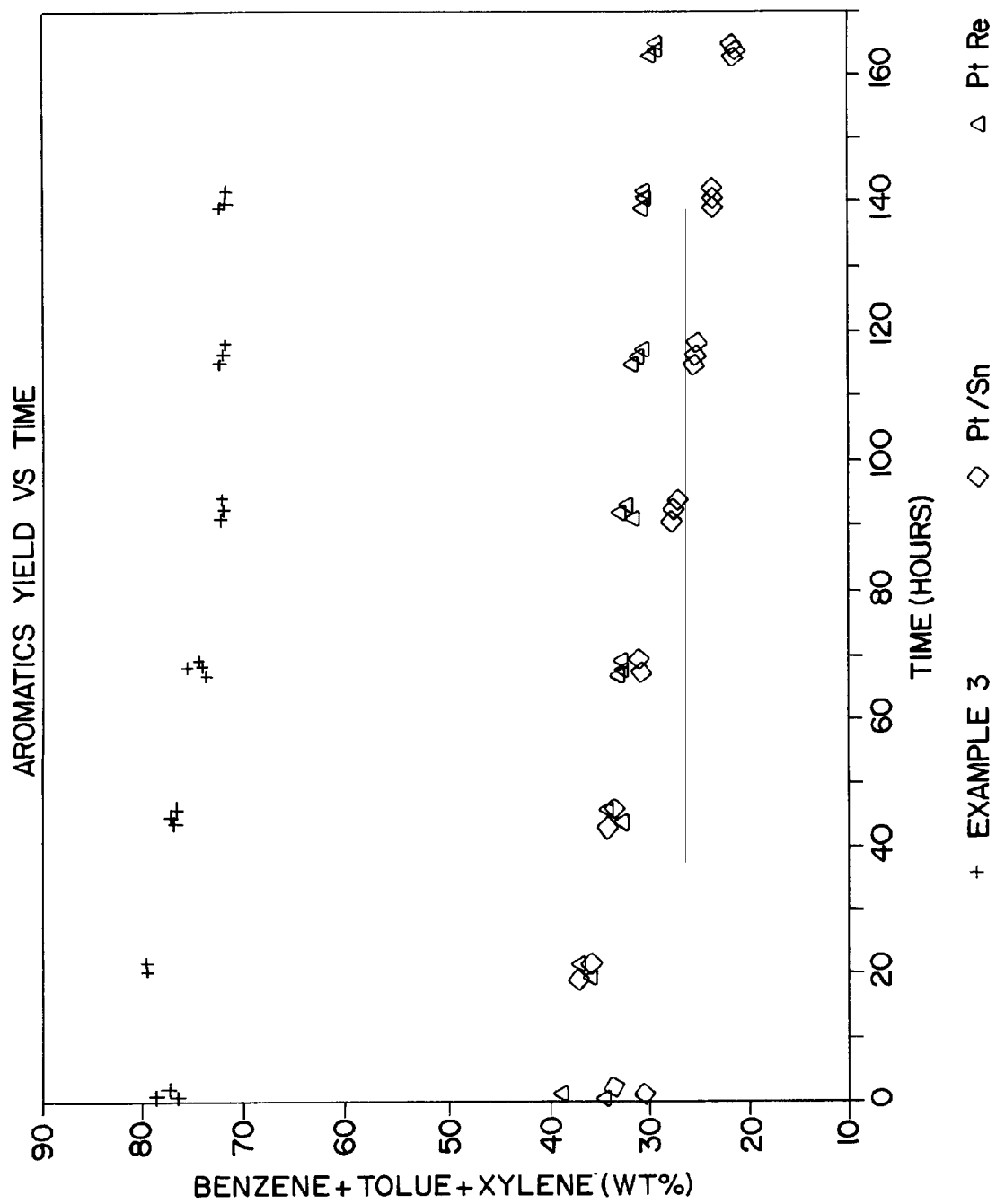
FIG. 4: Shows the yield (FIG. 4A) and selectivity (FIG. 4B) of aromatics using a process of the invention when the feedstock is a $C_6$–$C_7$ hydrocarbon cut from a naphtha.
Figure 4B:
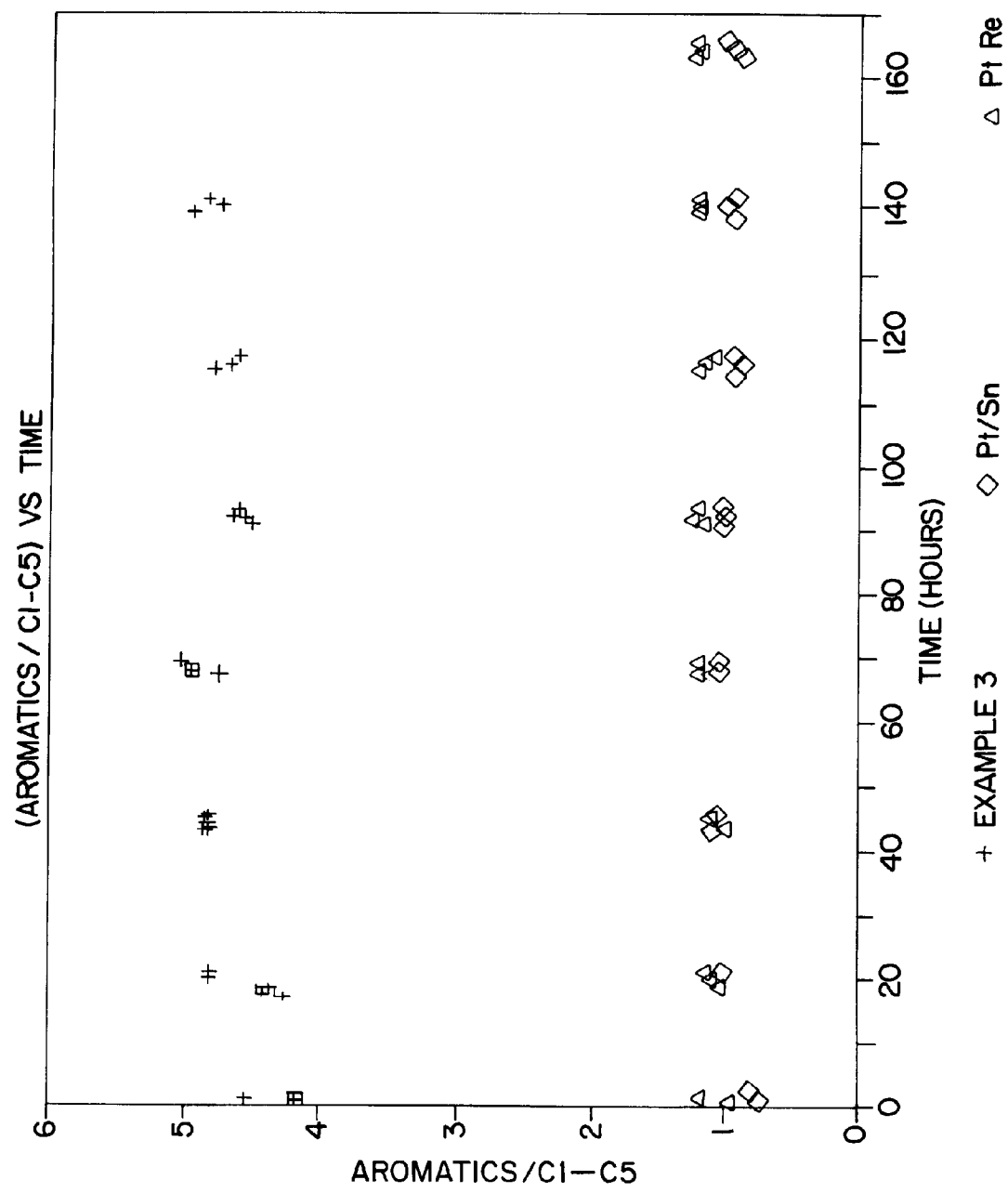

The results are set out in the form of graphs in FIGS. 4A and 4B. It can be seen that the hockeypuck catalyst used in the present process gives 2 to 3 times higher aromatic yields than other catalysts, and 4 to 5 times the selectivity for aromatics than a conventional Pt/catalyst or Pt/Re catalyst.

What is claimed is:

1. A process for reforming a petroleum hydrocarbon feed stream comprising contacting the stream under reforming conditions with a catalyst which comprises a zeolite KL in which the Zeolite crystals are cylindrical and have an average cylinder wall length of 0.1 to 0.6 microns, and an average cylinder wall length:diameter ratio of less than 0.5 and have microscopically flat basal planes, said Zeolite being the crystallization product of a mixture comprising q moles of water, a divalent cation, said divalent cation present in said mixture and present at a level of up to 250 ppm, a source of m moles of $K_2O$, a source of n moles of $SiO_2$ and a source of p moles of $AL_2O_3$ where m:n is 0.2 to 0.35 and n:p is 15 to 160 and q:m is 45 to 70, which zeolite is further impregnated with a metal hydrogenation-dehydrogenation promotor, wherein the basal planes of said cylindrical crystals are flatter than the basal planes of crystals prepared from an otherwise identical synthesis mixture which is free of said divalent cation.

2. A process as claimed in claim 1 in which the average length:diameter ratio of the zeolite crystals is at least 0.2.

3. A process as claimed in claim 2 in which the average height:length ratio of the Zeolite crystals is 1 to 1.2, wherein the height is the longest measurement of the cylinder height in the same direction as cylinder wall length.

4. A process as claimed in claim 3 in which the average height:length ratio is approximately 1.

5. A process as claimed in claim 1 where m:n is 0.24 to 0.30 and n:p is 20 to 40 and q:m is 50 to 65.

6. A process as claimed in claim 1 in which the divalent cation is nickel, magnesium, calcium, barium, cobalt, manganese, zinc, copper or tin.

7. A process as claimed in claim 6 in which the cation is magnesium or barium.

8. A process as claimed in claim 6 in which the metal hydrogenation-dehydrogenation promotor comprises platinum.

9. A process as claimed in claim 8 in which the zeolite KL is impregnated with 0.4 to 0.8 weight percent of metal hydrogenation-dehydrogenation promotor based on the weight of the zeolite.

10. A process as claimed in claim 6 in which the reforming takes place in a plurality of reforming reaction zones comprising first and second reaction zones, wherein said second reaction zone contains said Zeolite KL catalyst.

11. A process as claimed in claim 10 in which said first reaction zone is at a temperature of 850–950° F. (454–510° C.) and a pressure of 300 to 600 psig (2068 to 4137 kPa).

12. A process as claimed in claim 11 in which said second reaction zone is at a temperature of 875–975° F. (468–524° C.) and a pressure of 100 to 400 psig (689 to 2758 kPa).

13. A process as claimed in claim 12 in which said second reaction zone is at a pressure of 100 to 200 psig (689 to 1379 kPa).

14. A process as claimed in claim 10 in which the petroleum hydrocarbon feed stream is a hydrodesulfurized naphtha.

15. A process as claimed in claim 14 comprising passing the feed stream through said first reaction zone to obtain a partially reformed reformate, and then passing said reformate through said second reaction zone.

16. A process as claimed in claim 14 comprising passing said feed stream through said first reaction zone;

splitting aromatic product into (a) an aromatic rich stream comprising more than 50% by weight of the aromatic material in the product stream and (b) a paraffin rich stream comprising more than 50% by weight of paraffinic material in the product stream; and passing the stream (b) through said second reaction zone.

17. A process as claimed in claim 16 in which said aromatic-rich stream is mixed with the product obtained by passing said paraffin rich stream through said second reaction zone.

18. A process as claimed in claim 14 comprising:

(a) fractionating the naphtha feed stream into a first stream which is rich in hydrocarbons containing 8 or more carbon atoms and (ii) a second stream rich in hydrocarbons containing 6 or 7 carbon atoms;

(b) passing said first stream through said first reaction zone to obtain a product;

(c) passing said second stream through said second reaction zone to obtain a product.

19. A process according to claim 18 in which said first stream contains more than 50% by weight of the hydrocarbons of 8 or more carbon atoms which were in the naphtha feedstream, and in which said second stream contains more than 50% by weight of the hydrocarbons of 6 to 7 carbon atoms which were in the naphtha feedstream.

20. A process as claimed in claim 19 further comprising the step of mixing the products of steps (b) and (c).

21. The process of claim 1 which is an aromatization process and wherein said feedstream contains more than 50% by weight of hydrocarbons of 6 to 7 carbon atoms.

22. A process as claimed in claim 21 in which the feedstream is contacted with the catalyst at a temperature of 875–975° F. (468–524° C.) and a pressure of 100 to 400 psig (689 to 2758 kPa).

23. A process as claimed in claim 22 in which said pressure is 100 to 200 psig (689 to 1379 kPa).

24. The process of claim 1 wherein the average diameter of said crystals is 0.3 to 1.5 microns.

25. The process of claim 24 wherein the average diameter of said crystals is 0.4 to 1.0 microns.

26. The process of claim 1 wherein the average length of said crystals is 0.1 to 0.3 microns.

* * * * *